(12) United States Patent
Brown et al.

(10) Patent No.: US 8,857,162 B2
(45) Date of Patent: Oct. 14, 2014

(54) COOLANT WARM-UP USING EXHAUST

(71) Applicant: Caterpillar Inc., Peoria, IL (US)

(72) Inventors: Cory Andrew Brown, Peoria, IL (US); Joshua Wayne Steffen, El Paso, IL (US)

(73) Assignee: Caterpillar Inc., Peoria, IL (US)

( * ) Notice: Subject to any disclaimer, the term of this patent is extended or adjusted under 35 U.S.C. 154(b) by 95 days.

(21) Appl. No.: 13/667,428

(22) Filed: Nov. 2, 2012

(65) Prior Publication Data

US 2014/0123626 A1    May 8, 2014

(51) Int. Cl.
*F01N 5/02* (2006.01)
*F02B 27/04* (2006.01)
*F01N 5/04* (2006.01)
*F01N 1/00* (2006.01)
*F02B 33/44* (2006.01)
*F17C 7/02* (2006.01)
*F17C 9/02* (2006.01)
*F01N 3/02* (2006.01)

(52) U.S. Cl.
CPC .................................. *F01N 3/0205* (2013.01)
USPC ................ 60/320; 60/273; 60/280; 60/324; 60/605.1; 62/50.1; 62/50.2

(58) Field of Classification Search
USPC .................. 60/273, 280, 320, 324, 605.1; 62/50.1–50.3
See application file for complete search history.

(56) References Cited

U.S. PATENT DOCUMENTS

| 3,738,334 | A | | 6/1973 | Farr |
| 4,033,135 | A | | 7/1977 | Mandrin |
| 4,216,751 | A | | 8/1980 | Davison et al. |
| 4,231,226 | A | | 11/1980 | Griepentrog |
| 4,341,194 | A | | 7/1982 | Wolters et al. |
| 4,359,996 | A | | 11/1982 | Kirkland, Jr. |
| 4,370,970 | A | | 2/1983 | Kunz |
| 4,391,235 | A | | 7/1983 | Majkrzak |
| RE35,874 | E | * | 8/1998 | Neeser et al. ................ 62/7 |
| 5,884,488 | A | * | 3/1999 | Gram et al. ................ 62/50.6 |
| 6,374,591 | B1 | | 4/2002 | Johnson et al. |
| 7,484,371 | B2 | | 2/2009 | Nierenberg |
| 2011/0099989 | A1 | | 5/2011 | Prior et al. |
| 2011/0202256 | A1 | * | 8/2011 | Sauve et al. ................ 701/104 |
| 2014/0033946 | A1 | * | 2/2014 | Billig et al. ................ 105/35 |

FOREIGN PATENT DOCUMENTS

| DE | 102007021526 A1 * | 11/2008 | ............... F01N 5/02 |
| EP | 0053369 A1 | 9/1982 | |
| WO | 2005038229 A1 | 4/2005 | |

* cited by examiner

*Primary Examiner* — Audrey K Bradley
(74) *Attorney, Agent, or Firm* — Baker Hostetler

(57) ABSTRACT

The present disclosure is directed to a system for reducing the cold start time for a vehicle with a twin fuel engine. The system has an exhaust system, from which exhaust is discharged and collected on an exhaust manifold. A heat exchanger is positioned within the exhaust system, with coolant flow passages in thermal communication with the engine, and the heat exchanger. A control valve is coupled to a first flow path operable to direct the exhaust through the heat exchanger across the first flow path and a second flow path in selective amounts.

20 Claims, 3 Drawing Sheets

COOLANT WARM-UP USING EXHAUST

TECHNICAL FIELD

The present disclosure relates generally to a natural gas fuel system for vehicles and more particularly, to a system and method for operating heavy duty vehicles in cold start conditions.

BACKGROUND

Natural gas is a clean-burning, relatively low priced alternative to gasoline and diesel as a transportation fuel, particularly in fleet and industrial vehicles. Natural gas is an odorless, nontoxic, gaseous mixture of hydrocarbons (primarily of methane—$CH_4$), but may also contain ethane, propane and heavier hydrocarbons. Because of the gaseous nature of natural gas, it is generally stored onboard a vehicle in either a compressed natural gas (CNG) state where pressurization may be about 3,000 psi, or a liquid natural gas (LNG) state, in thermally insulated tanks.

As used herein, the term "liquid natural gas fuel" may include natural gas, methane, ethane, ethylene, and/or hydrogen. It may also be referred to as liquefied cryogenic fuel, cryogenic LNG, or LNG. This liquid natural gas is stored at a certain temperature and pressure in a vehicle's tank. While the detailed description describes natural gas examples, it should be understood that other cryogenic fuels may be used as well.

LNG is produced by purifying natural gas and super-cooling it to $-260°$ F., condensing it into a liquid, and reducing its volume to about $1/600$ of its original volume. This denser form (as compared to CNG) has more potential energy for the amount of space it takes up, and more energy can be stored in the same amount of space on a vehicle.

LNG vehicle fuel provides an excellent means to reduce emissions. Due to the clean-burning nature of natural gas, LNG powered heavy-duty vehicles can achieve low emission rates without excessive and expensive emission control equipment as is required for diesel engines. One drawback of natural gas vehicles (NGVs) is their limited driving range and the absence of current infrastructure to re-fuel LNG vehicles.

Thus, fuel-intensive fleets are better-suited to run on natural gas, including LNG. A larger volume of vehicles makes it more economical to build natural gas engines, and fleets are more able to install their own natural gas infrastructure.

Large mining trucks are often operated in sub-freezing temperatures. At such low temperatures, a problem arises in converting, or vaporizing, the LNG to a gas form. While LNG has a low boiling temperature, the LNG may be at such a low temperature that contact with a vaporizer (often liquid), even indirect contact, may freeze the vaporizer.

Some engines may operate on both natural gas and diesel, known as twin or bi-fuel vehicles. The operator may switch between fuel types, with natural gas being the economical fuel of choice. Twin fuel trucks vaporize cryogenic LNG to burn in its engine. Engine coolant may be used for this. During initial engine startup, the coolant may be at a low temperature, and the coolant may freeze when vaporizing the LNG, blocking flow of coolant in the conduit.

Prior solutions include waiting for the engine to warm up and/or running the engine for a longer period of time using diesel fuel. After the coolant warms up in the engine, the LNG pump is switched on. Warming the engine up enough to warm the coolant may take 10-20 minutes or as long as several hours. Another approach is to include a large accumulated volume of vaporized (ready-to-combust) natural gas at a high pressure, separate from the liquefied state of the natural gas, which may run the engine while the engine warms up. However, large high pressure tanks are very expensive and take up a lot of vehicle space.

U.S. Pat. No. 4,231,226 to Griepentrog presents a solution to vaporize liquid natural gas by directing it into a heat exchange relationship with waste heat produced from a thermal power engine. Vapor discharged from the turbine is passed, and liquid natural gas is moved, through a heat exchanger, to cool the vapor and evaporate the liquid natural gas. In the '226 patent, exhaust gas is used as the vaporizer.

SUMMARY

In a first embodiment, a system for reducing the cold-start time in a vehicle with a twin or bi-fuel engine is disclosed. The system has an exhaust system, from which exhaust is discharged and collected on an exhaust manifold. A heat exchanger is positioned within the exhaust system, with coolant flow passages in thermal communication with the engine, and the heat exchanger. A control valve is coupled to a first flow path operable to direct the exhaust through the heat exchanger across the first flow path and a second flow path in selective amounts.

In an alternate embodiment, a method for vaporizing cryogenic liquid natural gas (LNG) in a vehicle is disclosed. First, the method initializes an engine which includes an exhaust system. Second, the method directs a portion of exhaust through a first heat exchanger, and directs a circulating liquid from the engine through the first heat exchanger, allowing the exhaust to heat the circulating liquid within the first heat exchanger to at least a first predetermined temperature. Next, the circulating liquid from the first heat exchanger towards the cryogenic LNG; and vaporizing the cryogenic LNG.

In an alternate embodiment, a system is disclosed for reducing a cold start time for a twin-fuel vehicle. The system includes an engine capable of generating exhaust from diesel or gasoline combustion; the exhaust collects on an exhaust manifold. A first conduit, including a control valve, coupled to the exhaust manifold, directs a portion of the exhaust from the exhaust manifold across a first heat exchanger. A second conduit, including a first pump, is coupled to a coolant reservoir, and directs coolant from the coolant reservoir into the first heat exchanger. A sensor is configured to measure a temperature of the coolant within the first heat exchanger, and an Electronic Control Module coupled to the sensor and the control valve modulates the exhaust flow based, at least in part, on the temperature of the coolant.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
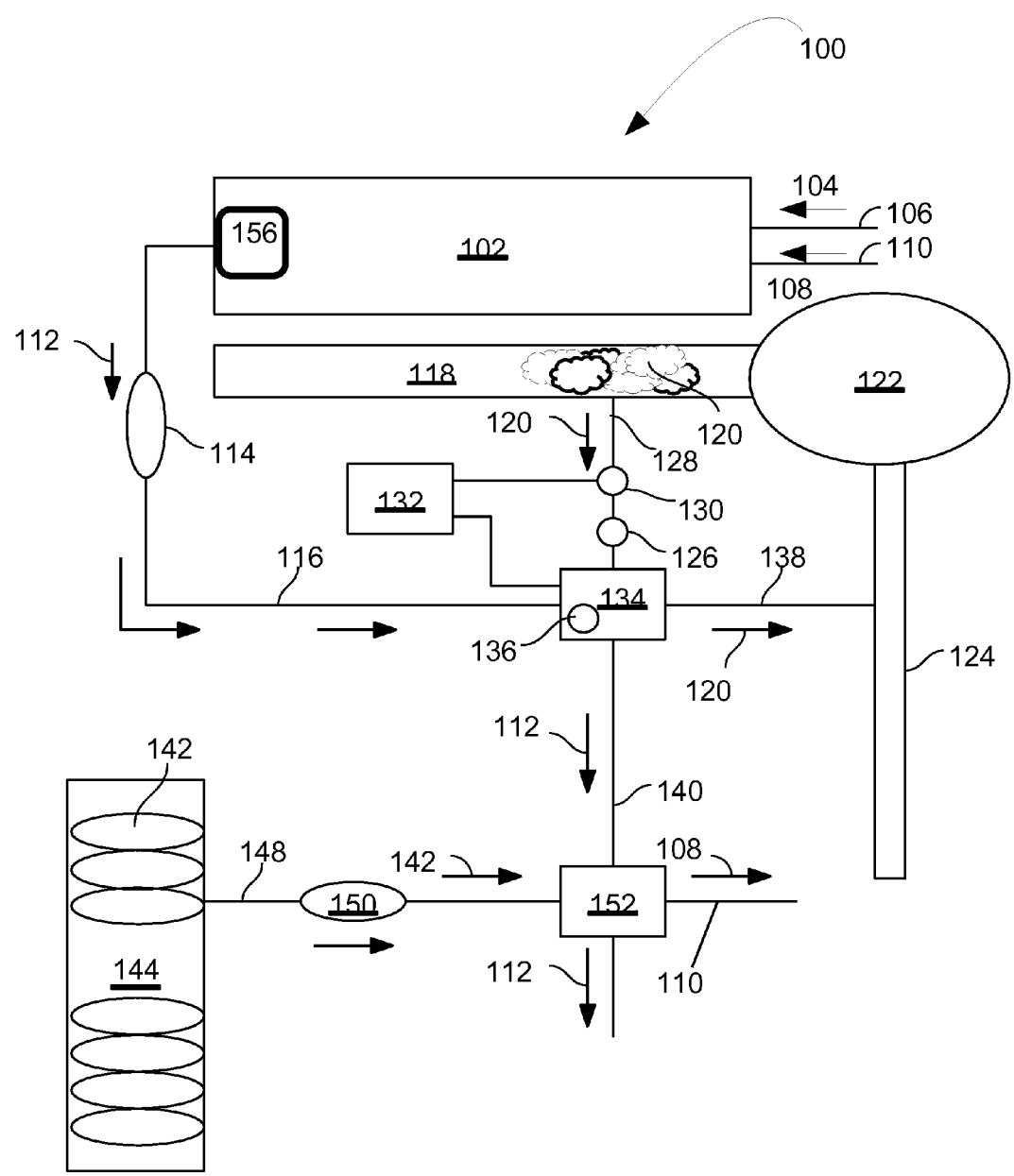
FIG. 1 is a block diagram of the LNG vaporization system.

FIG. 1 illustrates an embodiment of system 100 for reducing a cold start time in an LNG vehicle, In FIG. 1, the twin, or bi-fuel engine 102 is an internal combustion engine capable of running on a conventional fuel, such as diesel fuel, as well as a second fuel, natural gas. The diesel fuel 104 and natural gas 142 are stored separately, and do not mix. Engine 102 runs on one fuel at a time, and in this embodiment, does not run on a blended fuel mix. While engine 102 is capable of running on diesel fuel, natural gas is the preferred fuel due to its previously described benefits. However, natural gas 142 may not be vaporized to be used in engine 102 immediately in a cold start situation, and thus, diesel fuel is the fuel 104 in system 100 to initialize engine 102 in cold start situation.

Exhaust gas 120 is generated from the combustion of diesel fuel 104 and collects in an exhaust manifold 118. The exhaust manifold 118 is made from cast iron or stainless steel and exhaust gas 120 from multiple ports and cylinders from engine 102 collects here on the manifold 118 in one centralized location to be delivered to the exhaust stack 124. The majority of exhaust 120 may be routed through exhaust stack 124 by turbine 122 and released into the atmosphere.

In system 100, a portion of exhaust 120 is diverted through gas conduit 128 by the control valve 130 through the flow orifice 126 into heat exchanger 134. The heat exchanger 134 may be a finned coiled heat exchanger, otherwise known as an air to water heat exchanger.

The control valve 130 may be a modified turbocharger wastegate valve, conventionally used on many heavy duty vehicles to divert exhaust gases away from the turbine wheel in a turbocharged engine system. Wastegate valves control the volume of exhaust to a turbine, in order to regulate turbine rotation speed.

Un-warmed coolant 112 from a plastic coolant reservoir 156 in engine 102 may be pumped by an electromechanical pump 114 through a liquid conduit 116 into the heat exchanger 134, where exhaust 120 warms up coolant 112. Heat exchanger 134 separates coolant 112 from exhaust 120 in separate chambers to maintain the pressure necessary for pump 114 to route coolant 112 toward the LNG 142. Pump 114 moves coolant 112 at a rate to sufficient warm coolant 112 in heat exchanger 134, to a temperature where coolant 112 is able to vaporize the LNG 142. A thermostat 136 is connected to the electronic control module (ECM) 132 to measure the temperature of the coolant 112 to determine whether coolant 112 is sufficiently heated. When the coolant 112 flowing through the heat exchanger 134 is sufficiently heated to vaporize the liquid natural gas 142, or the coolant 112 is overheated, the ECM 132 signals to valve 130 to either reduce or even completely restrict the flow of exhaust 120 to lower the intensity of the heat source. The ECM 132 receives signals from temperature gauge 136 to control the control valve 130 accordingly, to maintain a desired coolant 112 temperature.

After exhaust 120 travels through heat exchanger 134 and warms up coolant 112, exhaust 120 loses some heat from the heat transfer. Exhaust 120 continues to pass through heat exchanger 134 and exits exhaust stack 124 through conduit 138, or is otherwise released from system 100.

The LNG storage tank 144 may be constructed of a suitable material such as stainless steel so as to safely store a volume of liquefied natural gas 142 at a low pressure. The liquefied cryogenic fuel in the primary insulated storage tank is desirably at about 5 psig to 150 psig and a temperature of about −252° F. to −186° F. To achieve pressure and refrigeration, LNG tank 144 includes a combination of insulation and vacuum, called super-insulation, to maintain thermal efficiency and contain the LNG without loss. LNG tank 144 is typically a double-walled, vacuum-insulated pressure vessel. The vessel may be horizontal or vertical, vacuum-jacketed, pressure vessels.

Conduit 148 may be coupled with the interior of tank 144 and the pump 150 may pump the LNG 142 to be vaporized and used as fuel. LNG 142 may be directed through conduit 148 through heat exchanger 152 where it may be vaporized. Heated coolant 112 exiting heat exchanger 134 by conduit 140 may provide heat transfer to vaporize LNG 142 to a vaporized natural gas state 108, which may then be routed to the engine 102 by natural gas line 110 to be used as fuel. Coolant 112 may then be recirculated to the engine.

Figure 2:
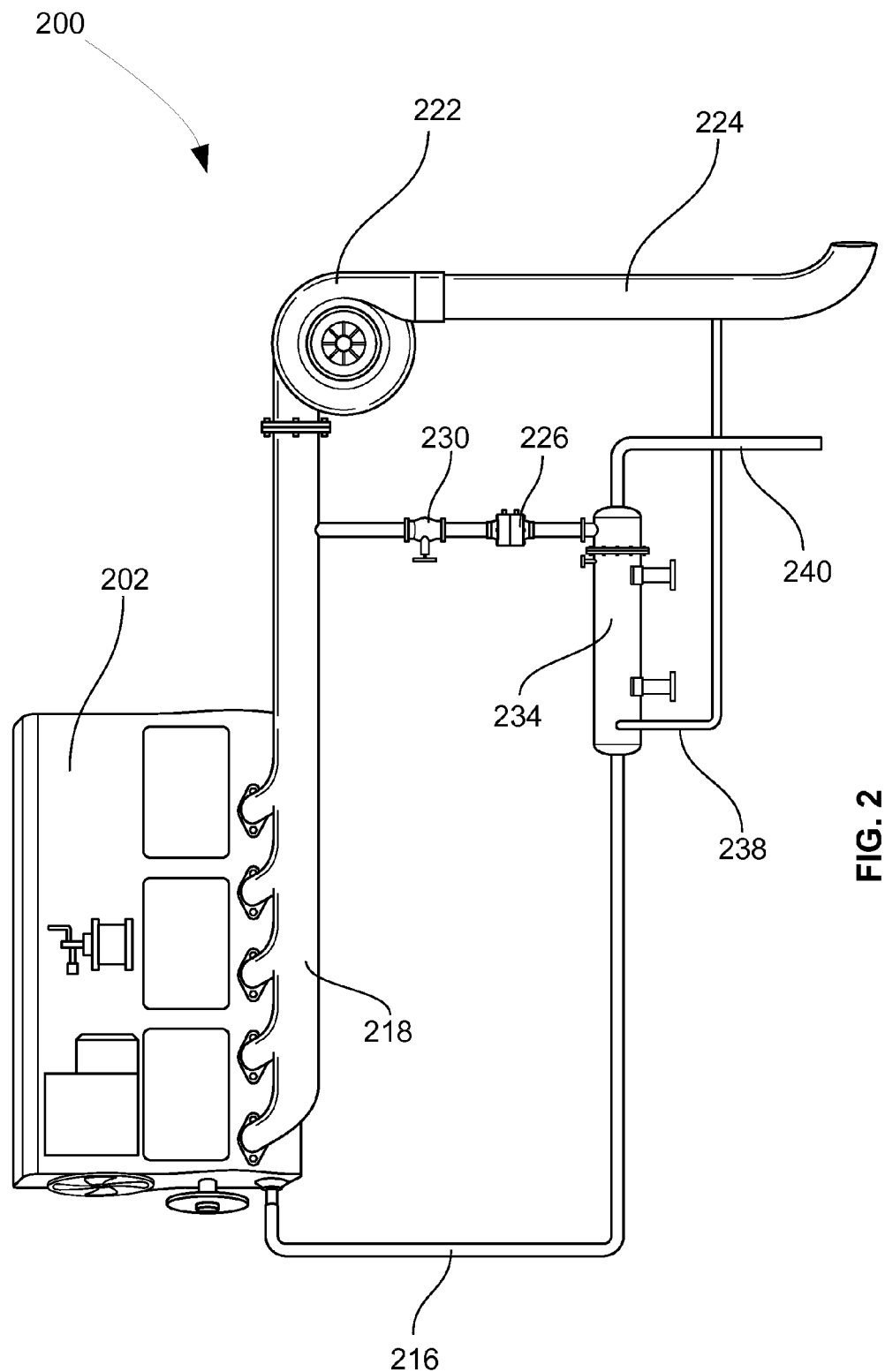
FIG. 2 is a top view of the coolant warm-up system.

FIG. 2 illustrates a top view of another embodiment of the system 200 for warming up coolant, to reduce the cold start time in a twin-fuel vehicle. The control valve system 230 divides the amount of exhaust from exhaust manifold 218 between flow path 224 through turbine 222, and flow path 226 where it flows through the air to water heat exchanger 234. Coolant is pumped from the engine 202 through pipe 216 and flows into the heat exchanger 234. When the coolant is at a first predetermined coolant temperature, such as a temperature when the coolant may vaporize the cryogenic LNG without freezing, the coolant exits heat exchanger 234 through conduit 240, towards the liquid natural gas. At a second predetermined temperature, such as when the coolant at an optimal temperature to vaporize the LNG, an exhaust flow control valve 230 may restrict or reduce the exhaust flow through 226 to stop excess heating of the coolant. At a third predetermined temperature, such as when the coolant reaches a maximum temperature, the controller may signal to the exhaust flow valve to shut conduit 230, and the exhaust flows through only path 224, bypassing the heat exchanger 234.

A thermostat, or electronic thermostat within heat exchanger 234, may sense the temperature of the coolant within, or just as it is exiting, the heat exchanger 234, and transmit the temperature signal to a controller. A control valve 230 system may include an Electronic Control Module coupled to the thermostat and modulate exhaust flow based, at least in part, on the temperature of the coolant. A controller may be operable to receive the thermostat signal and send a signal to modulate the exhaust control valve to a first, a second, and a third position. The control valve 230 may be an existing turbocharger waste gate control valve.

The exhaust flow may be modulated from a zero flow to a fully open position for controlling exhaust flow, and thus, controlling the coolant heating source. The first position is a fully open position of the control valve where the exhaust flows through the first flow path and the second flow path. The second position is a partially closed position where the exhaust flows through the first flow path and the second flow path, although the exhaust and the third position is a fully closed position. The used, as well as the bypassed exhaust, is released from the system.

Disclosed systems may be beneficial for use in operating twin fuel vehicles in freezing temperatures. The effectiveness of the example systems in reducing a cold start time depends on the ambient air temperature.

Natural gas is a combustion fuel. Combustion involves a source of fuel, oxygen, and a source of ignition. The mix of fuel and air has to be between a 5% and 15% by volume in air. Outside of this range, the methane/air mixture is not flammable. When the percentage of natural gas is higher than 15% in proportion to oxygen, the mixture is "over rich" and no combustion will occur. A mixture with less than 5% methane is "too lean," and no combustion will occur. When natural gas is stored as a liquid, it must be vaporized into gas to mix with oxygen and be combustible.

INDUSTRIAL APPLICABILITY

The disclosed system 100 can be used with twin or bi-fuel diesel and liquefied natural gas (LNG) powered vehicles, and may be useful when starting vehicle engines in cold weather conditions. This system may be used to quickly start large mining trucks which run on both diesel fuel and LNG in freezing conditions.

Figure 3:
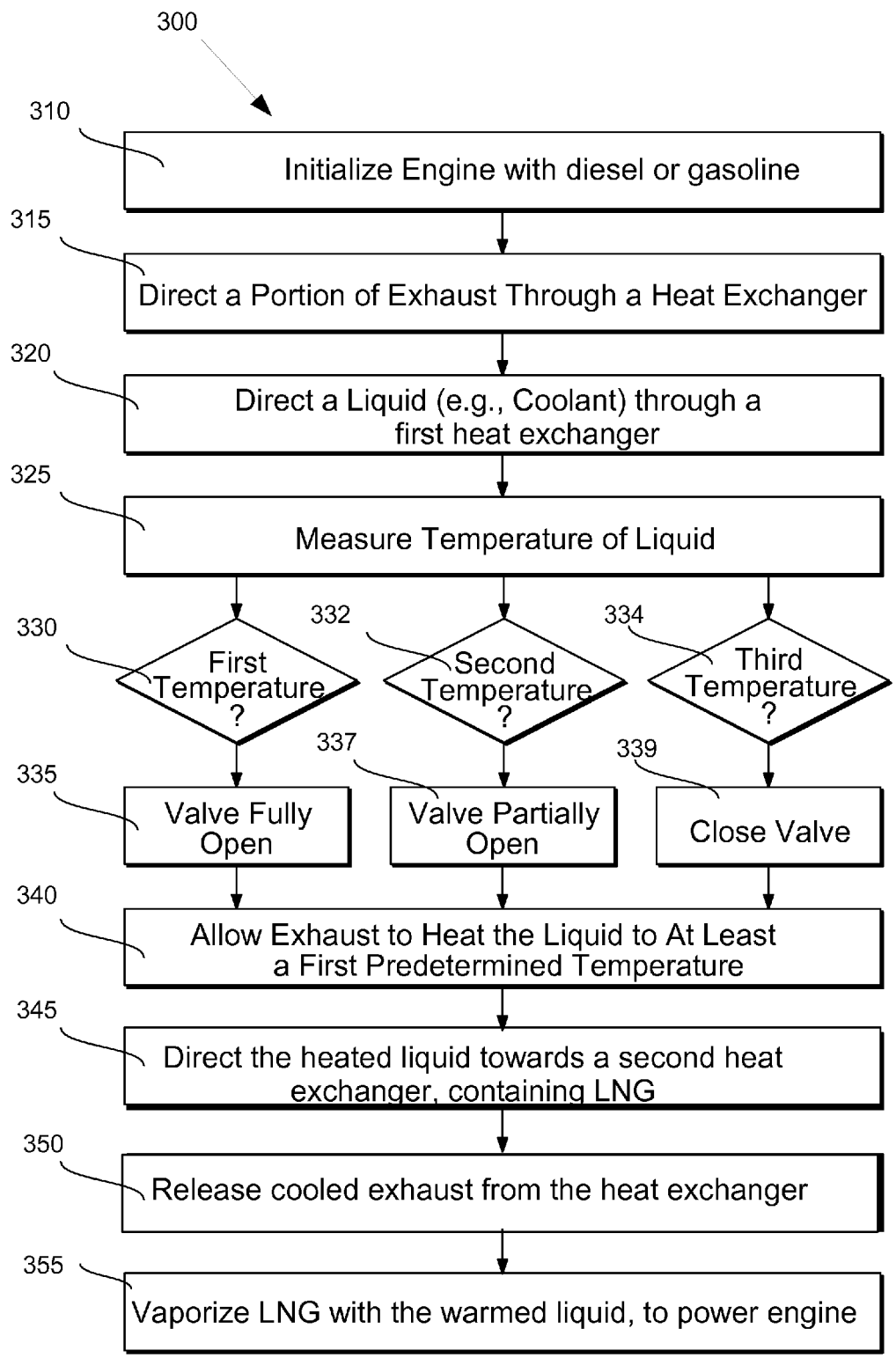
FIG. 3 is flow chart illustrating the disclosed method.

FIG. 3 illustrates in flow chart 300 form a method for vaporizing natural gas in a vehicle 300, described in reference to the system of FIG. 1. In operation 310, an engine 102 is run using a fuel 104, such as diesel fuel or gasoline. Next, in operation 315, a portion of the exhaust 120 from the engine 102 which has gathered on an exhaust manifold 118 is diverted through a heat exchanger 134, though a conduit 128 with a control valve. In operation 320 a circulating liquid 112 such as engine coolant is pumped from a reservoir 156 in engine 102, through the same heat exchanger 134 that the exhaust 120 flows through.

In operation 325 a thermostat 136 may measure the temperature of the circulating liquid 112 while it is in the heat exchanger 134, or immediately as it flows from the heat exchanger 134. At 330, if the circulating liquid 112 is at or below a first predetermined temperature 330, then the control valve 130 on the conduit 128 directing the exhaust 120 to the heat exchanger 134 remains fully open 335. If the liquid 112 is at a second predetermined temperature 332, then the control valve 130 on the conduit 128 directing the exhaust to the heat exchanger 134 is partially open 337, allowing a lesser portion of the exhaust 120 through to the heat exchanger 134. If the liquid 112 as at or higher than a third predetermined temperature 334, the control valve 130 on the conduit 128 directing the exhaust 120 closes 339, preventing exhaust 120 from reaching the heat exchanger 134. As shown in operation 340, the liquid 112 should ideally remain in the heat exchanger 134 until it heats to the first temperature; however the liquid 112 may exit the heat exchanger 134 before it reaches this first temperature, if the pump 114 is moving the liquid 112 through system 100 at a steady rate.

After warming up, the circulating liquid 112 exits the first heat exchanger 134 through a conduit 140, as shown in operation 345, towards the liquid natural gas 142, and in operation 350, the exhaust 120 which flowed through the heat exchanger 134 is released. In operation 355, the warmed circulating liquid 112, and the liquid natural gas 142 may both enter a second heat exchanger 152, where the liquid natural gas 142 is vaporized to a gas state as vaporized liquid natural gas 108.

The system of this disclosure can be used with trucks used in agriculture, public transportation, mining, or with any other twin fuel truck capable of operating with diesel and liquid natural gas. This system allows trucks started in a cold start situation to switch to liquid natural gas faster than they would otherwise in a cold start situation, and is thus ideally suited for fleet truck applications in cold climates.

Example systems have an engine with an exhaust system capable of running on diesel. A portion of the exhaust flow collected on the exhaust manifold is diverted through a first heat exchanger. A circulating liquid in thermal communication with the engine such as engine coolant, is diverted from the engine through the heat exchanger.

The present disclosure alleviates the problem of excessive warm up time and large space requirements for vaporizing cryogenic liquid natural gas (LNG) in a twin fuel vehicle, such as a truck or large mining truck.

The system in this disclosure uses a heat source which is already generated as a waste gas. Therefore, the system requires little additional energy and cost to implement. Because natural gas is an environmentally and economically friendly alternative to conventional combustion fuels, the entire system is economically and environmentally advantageous.

Benefits arising from the present disclosure may include reduced cost and complexity. There may be less stability or reliability in vaporizing the LNG with the exhaust gas itself. The system disclosed may be used with any vehicle, but may particularly benefit LNG large mining trucks.

What is claimed is:

1. A method for vaporizing cryogenic liquid natural gas (LNG) for use in an engine, the engine including an exhaust manifold, the method comprising:
    directing a portion of exhaust through a first heat exchanger;
    directing a circulating liquid through the first heat exchanger;
    heating the circulating liquid within the first heat exchanger to at least a first predetermined temperature;
    directing the circulating liquid from the first heat exchanger through a second heat exchanger; and
    vaporizing the cryogenic LNG within the second heat exchanger using heat from the circulating liquid.

2. The method of claim 1, wherein the circulating liquid is engine coolant.

3. The method of claim 1, wherein vaporizing the cryogenic LNG includes
    pumping the cryogenic LNG from a pressurized LNG tank into the second heat exchanger.

4. The method of claim 1, further comprising:
    measuring the temperature of the circulating liquid within the first heat exchanger with an electronic thermostat; and
    transmitting a temperature signal of the circulating liquid to a controller, the controller operable to modulate a control valve controlling the flow of exhaust.

5. The method of claim 1, further comprising:
    measuring the temperature of the circulating liquid when exiting the first heat exchanger with an electronic thermostat; and
    transmitting a temperature signal of the circulating liquid to a controller operable to modulate a control valve controlling the flow of exhaust.

6. The method of claim 1, wherein the engine is configured to run on either a first type of fuel or a second type of fuel, wherein the first fuel is different from the second fuel and one of the first fuel and the second fuel is natural gas.

7. The method of claim 1, wherein the first predetermined temperature is a temperature at which the circulating liquid is able to vaporize the cryogenic LNG without the circulating liquid freezing.

8. The method of claim 1, wherein the circulating liquid vaporizes the cryogenic LNG within a predetermined time from initializing the engine, where the predetermined time is a shorter period time than a time period to vaporization of the cryogenic LNG in the absence of a heat exchange relationship between a portion of the exhaust and the circulating liquid.

9. The method of claim 1, further comprising limiting the flow of exhaust when the circulating liquid reaches a second predetermined temperature within the first heat exchanger.

10. The method of claim 9, wherein the second predetermined temperature is a temperature at which the circulating liquid vaporizes the cryogenic LNG without the circulating liquid freezing.

11. The method of claim 1, further comprising stopping the flow of exhaust to the first heat exchanger when the circulating liquid reaches a third predetermined temperature within the first heat exchanger.

12. The method of claim 11, wherein the third predetermined temperature is a temperature at which the circulating liquid is below its boiling point.

13. A system for reducing a cold-start time in a vehicle with an engine, comprising:
   an exhaust manifold that is configured to receive and collect discharged exhaust gas from the engine;
   a first heat exchanger connected to the exhaust manifold;
   a second heat exchanger connected to the first heat exchanger;
   coolant flow passages in thermal communication with the first heat exchanger and the second heat exchanger, the coolant flow passages configured to receive a coolant;
   a control valve, coupled to a first flow path, operable to direct the exhaust through the first heat exchanger across the first flow path and a second flow path in selective amounts;
   wherein the first heat exchanger is configured to heat the coolant using heat from the exhaust gas and the second heat exchanger is configured to vaporize cryogenic LNG using heat from the coolant.

14. The system of claim 13, further comprising liquid natural gas flow passages in thermal communication with the second heat exchanger.

15. The system of claim 13, wherein the control valve is a turbocharger waste gate control valve.

16. The system of claim 13, further comprising:
   a thermostat operable to sense the temperature of the coolant in, or exiting, the heat exchanger; and
   a controller operable to receive a thermostat signal and send a signal to modulate the control valve to a first, a second, and a third position based on the thermostat signal.

17. The system of claim 16, wherein:
   the first position is a fully open position of the control valve where the exhaust flows through the first flow path and the second flow path,
   the second position is a partially closed position of the control valve where the exhaust flows through the first flow path and the second flow path, the amount of exhaust flowing through the first flow path being less than the amount flowing through the first flow path in the first position, and
   the third position is a fully closed position of the control valve, where the exhaust flows through only the second flow path.

18. A cold-start reduction system for a twin-fuel engine comprising:
   an engine configured to run on either a first fuel or a second fuel, wherein the first fuel is different from the second fuel and one of the first fuel and the second fuel is liquid natural gas (LNG);
   an exhaust manifold in fluid communication with the engine, the exhaust manifold configured to receive exhaust gas from the engine;
   a coolant reservoir configured to receive a coolant;
   a first heat exchanger coupled to the exhaust manifold by a first conduit, the first heat exchanger further coupled to the coolant reservoir by a second conduit, the first heat exchanger configured to transfer heat from the exhaust gas to the coolant;
   a storage tank that is configured to receive cryogenic LNG; and
   a second heat exchanger coupled to the first heat exchanger by a third conduit, the second heat exchanger further coupled to the storage tank by a fourth conduit, the second heat exchanger configured to transfer heat from the coolant heated by the first heat exchanger to the cryogenic LNG so as to vaporize the LNG.

19. The system of claim 18, further comprising:
   a thermostat operable to sense a temperature of the coolant after the coolant is heated by the exhaust gas; and
   a controller operable to receive a thermostat signal and send a signal to modulate the control valve based on the thermostat signal.

20. The system of claim 19, wherein the controller modulates the control valve to:
   a fully open position in which the exhaust gas flows from the exhaust manifold to the first heat exchanger at a first rate,
   a partially closed position in which the exhaust gas flows from the exhaust manifold to the first heat exchanger at a second rate, wherein the first rate is greater than the second rate, and
   a fully closed position in which exhaust gas does not flow to the heat exchanger.

* * * * *